Nov. 17, 1970    W. J. FRANK, JR    3,541,417
PULSING SYSTEM INCLUDING BINARY CODED DECIMAL RATE MULTIPLIER
Filed Dec. 26, 1968    2 Sheets-Sheet 1

INVENTOR
WILLIAM J. FRANK, JR.
BY
YOUNT, FLYNN, & TAROLLI
ATTORNEYS

INVENTOR
WILLIAM J. FRANK, JR.
BY YOUNT, FLYNN & TAROLLI
ATTORNEYS

United States Patent Office 3,541,417
Patented Nov. 17, 1970

3,541,417
PULSING SYSTEM INCLUDING BINARY CODED DECIMAL RATE MULTIPLIER
William J. Frank, Jr., Glendora, Calif., assignor to The Warner & Swasey Company, Cleveland, Ohio, a corporation of Ohio
Filed Dec. 26, 1968, Ser. No. 786,948
Int. Cl. G05b *19/20*
U.S. Cl. 318—571　　　　　　　　　　　　　7 Claims

ABSTRACT OF THE DISCLOSURE

An input pulse train having a frequency equal to a multiple, N, of a reference frequency, $f$, is applied to a 1–2–4–8 binary coded decimal counter. AND gates are connected to certain stages of the counter to provide an output pulse train whose frequency may be any selected decimal fraction of that of the input pulse train. A frequency divider divides this output train by the same multiple, N. For any selected decimal fraction, the successive pulses coming out of the divider are substantially equally spaced.

---

This invention relates to a pulsing system and particularly to a system for producing a train of substantially equally spaced pulses whose repetition rate or frequency is a selected decimal fraction of the repetition rate or frequency of another train of pulses, such that the two trains of pulses may be applied to respective pulse-responsive translating devices, such as servo motors, whose speed ratio is to correspond to the selected decimal fraction.

An important practical application of the present invention is in the digital control of machine tools in which a tool-supporting cross slide and a cross slide-supporting carriage are moved along mutually perpendicular coordinate axes by separate servo systems which are controlled digitally, such as by a tape control, so that the tool is moved along a predetermined path which is the resultant of the respective coordinate movements of the carriage and the cross slide. In such systems a first pulse train of a predetermined frequency or repetition rate, $f$, which preferably is proportional to the rotational speed of the work-supporting spindle, is applied to a first servo system. The number of pulses in this first pulse train digitally represents the distance along one coordinate axis through which the tool is to be moved. A second pulse train is applied to a second servo system and it has a frequency or pulse repetition rate which is a fraction of the frequency or pulse repetition rate of the first pulse train, equal to the fractional relationship between the respective coordinate distances through which the tool is to be moved by the two servo systems.

In the present system this fractional relationship between the frequencies or pulse repetition rates of the two pulse trains may be any desired decimal relationship. To this end the present system has a rate multiplier which includes a binary coded decimal counter and a plurality of AND gates connected to different stages of the counter such that, by the selection of one or more of the AND gates, any selected decimal fractional relationship may be provided between the output pulse train passed by the selected AND gates and the input pulse train to the counter.

In previous systems of this general type, various techniques were adopted in an attempt to even out the spacing between the output pulses, it being recognized that the mean square error for an incremental path between two points is a minimum if the steps are evenly spaced. However, the effectiveness of these prior arrangements was limited by the fact that the frequency or pulse repetition rate of the input pulses to the binary coded decimal counter was the same as that of the input pulses to the other servo system. The present system overcomes the deficiencies of these prior systems by applying to the binary coded decimal counter input pulses whose frequency is a multiple, greater than one, of the input pulse frequency to the other servo system and by dividing the combined pulse outputs from the AND gates by this same multiple. In accordance with the present system, the AND gates are connected to different stages of the binary coded decimal counter in a novel manner which, in combination with the multiplication of the pulse rate input to the counter and the corresponding division of the pulse rate output from these gates, enables the spacing between successive output pulses to be more nearly equalized, for the different possible decimal fractions, than was possible in the prior art arrangements.

It is, therefore, an object of the present invention to provide a novel and improved pulsing system which utilizes a binary coded decimal rate multiplier to produce an ultimate pulse train having substantially equally spaced pulses with a frequency or repetition rate which is a selected decimal fraction of the frequency of a reference pulse train.

Another object of this invention is to provide such a system in which the rate multiplier includes a binary coded decimal counter and a plurality of AND gates having novel connections to different stages of the counter and effective, in combination with a selected multiplication of the input pulse frequency to this counter and a corresponding division of the output pulse frequency from these gates, to provide improved equalization of the spacing between the output pulses for any selected decimal fractional relationship between the output and input pulse frequencies.

Other objects and advantages of the invention will become apparent from the following description taken in conjunction with the accompanying drawings, in which.

While the present invention is susceptible of various uses, it is particularly advantageous when embodied in a machine tool control to effect the movements of elements of the machine tool along coordinate axes in timed relation to the rotation of a work-supporting spindle. As an example, the present invention may be embodied in a lathe to effect movement of a tool to contour a workpiece in timed relation to the rotation of the spindle. For purposes of illustration the invention will be described as embodied in a lathe for this purpose.

Figure 1:
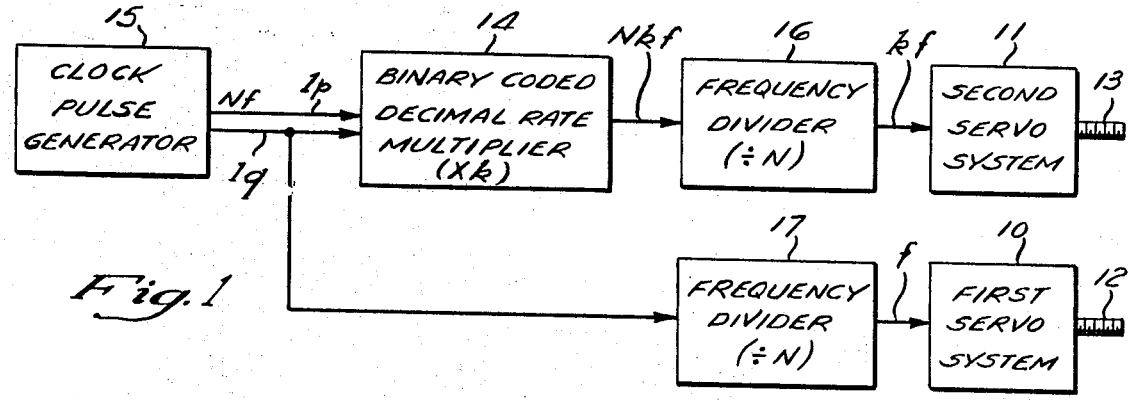
FIG. 1 is a block diagram of a machine tool control embodying the present pulsing system.

Referring now to the drawings, FIG. 1 shows a block diagram of various parts of a pulsing system embodying the present invention. In the illustrated embodiment, the pulsing system includes first and second servo systems 10 and 11, each of which operates in response to the application of a respective pulse train thereto to effect a predetermined rotation of a respective lead screw 12 or 13 for each pulse applied. Such systems are well known in the art for effecting rotation of each lead screw at an average rate proportional to the frequency or pulse repetition rate of the respective applied pulse trains. The lead screws 12 and 13 may be operatively connected respectively to a tool-supporting cross slide (not shown) and a cross slide carriage (not shown) to effect movements of the slide and carriage.

The servo systems 10 and 11 may be of any suitable type, such as a system including a step motor as shown and described in U.S. Pat. No. 2,922,940. The system is herein described as operating a servo motor in a single direction, but it is understood that the system can readily be adapted to operate a servo motor in two directions.

The lead screws 12 and 13 may be operatively connected respectively to a cross slide carriage having a tool-supporting cross slide supported thereon and to the tool-supporting cross slide, with the lead screw 12 effecting movement of the cross slide carriage parallel to the axis of a spindle for supporting and rotating a workpiece to be operated on by a tool on the cross slide, and the lead screw 13 effecting movement of the cross slide transverse to the spindle axis.

The rotations of the lead screws 12 and 13 are controlled to move the cross slide and carriage in their respective directions in a correlated manner to produce movement of the tool along a path which describes the desired cut of the workpiece. In the schematic showing of FIG. 1, it is assumed that the lead screw 12 is to be rotated an angular amount which is greater than the angular rotation of the lead screw 13 to effect the desired resultant movement of the tool on the cross slide. Since each of the lead screws 12 and 13 is rotated the same predetermined angular amount for each pulse applied to the respective servo system 10 or 11, the number of pulses to be applied to the second servo system 11 in a given period of time must be some fraction of the number of pulses applied during that time period to the first servo system 10, and since the rates of movement of the cross slide and carriage must be correlated, the respective frequencies of the pulse trains applied to the servo systems 10 and 11 must be related by the same ratio as the ratio of the desired angular rotation of the lead screws. It can be seen, therefore, that if a pulse train having a frequency represented by $f$ is applied to the first servo system 10, then a pulse train represented by $kf$, where $k$ is the fraction, may be applied to the second servo system 11 to effect the desired resultant movement of the tool on the cross slide.

In accordance with the present invention, a binary coded decimal multiplier 14 is provided to multiply the pulse frequency of the pulse train which is applied to the first servo system 10 by the decimal fraction $k$, so as to produce a pulse train to be applied to the second servo system 11 which is properly related to the pulse train being applied to the first servo system 10. A clock pulse generator, designated by the block 15, is provided to generate two pulse trains, each having evenly spaced pulses of a predetermined frequency, $Nf$, which preferably is proportional to the rotational speed of the spindle for supporting and rotating the workpiece. The pulse generator 15 may be of any conventional type capable of generating the desired frequency. The pulses in the pulse train on line $1q$, precede the pulses in the pulse train on line $1p$, as explained hereinafter. The pulse train outputs on lines $1p$ and $1q$ are acted on by the binary coded decimal multiplier 14, as explained hereinafter, to reduce the pulse frequency in accordance with a selected decimal fraction, $k$, so that the output pulse train from the multiplier 14 has the frequency $Nkf$. A frequency divider 16 divides this output pulse train by $N$, so that the pulse train applied to the second servo system 11 has the frequency $kf$. A similar frequency divider 17 is connected between the second output line $1q$ from the pulse generator 15 and the first servo system 10 to divide the $Nf$ output pulse train on line $1q$ by $N$, so that the pulse train applied to the first servo system has the frequency $f$.

Figure 2:
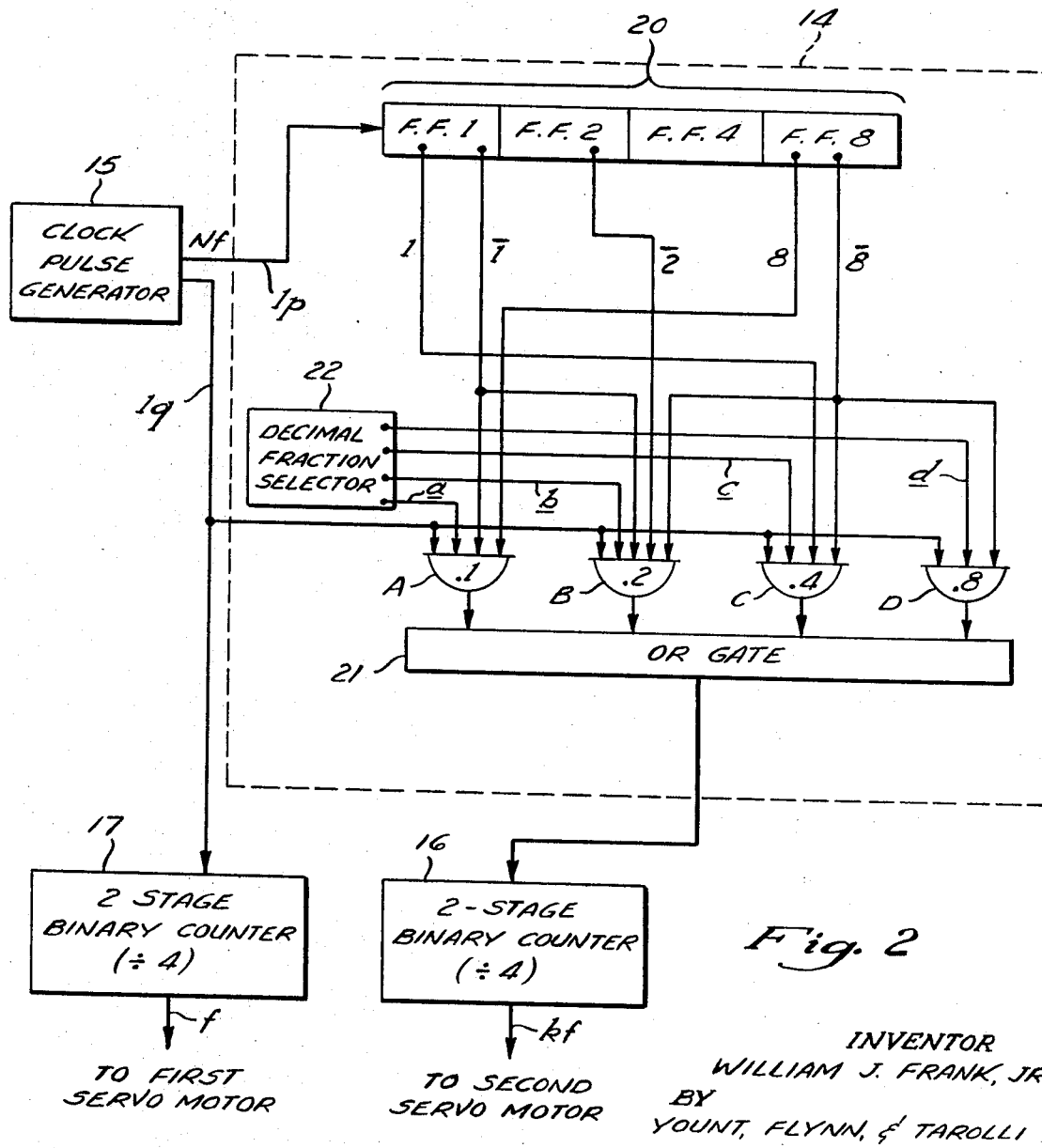
FIG. 2 is a schematic electrical circuit diagram of the present pulsing system.

Referring to FIG. 2, the dashed-line enclosure 14 encloses the components of the binary coded decimal multiplier designated by the block 14 in FIG. 1. These components include a 1–2–4–8 binary coded decimal counter 20 of conventional design, four AND gates, A, B, C and D, connected respectively to certain stages of the counter as described hereinafter, and an OR gate 21 connected to the outputs of all of the AND gates A, B, C and D.

The binary coded decimal counter 20 is composed of four successive binary counter stages, F.F.1, F.F.2, F.F.4 and F.F.8, which are weighted 1, 2, 4 and 8, respectively. These stages are interconnected in a known manner to cause the counter 20 to re-cycle after every ten input pulses applied to its first stage, F.F.1. Each counter stage comprises a flip-flop having two alternate stable conditions of conductivity.

Figure 3:
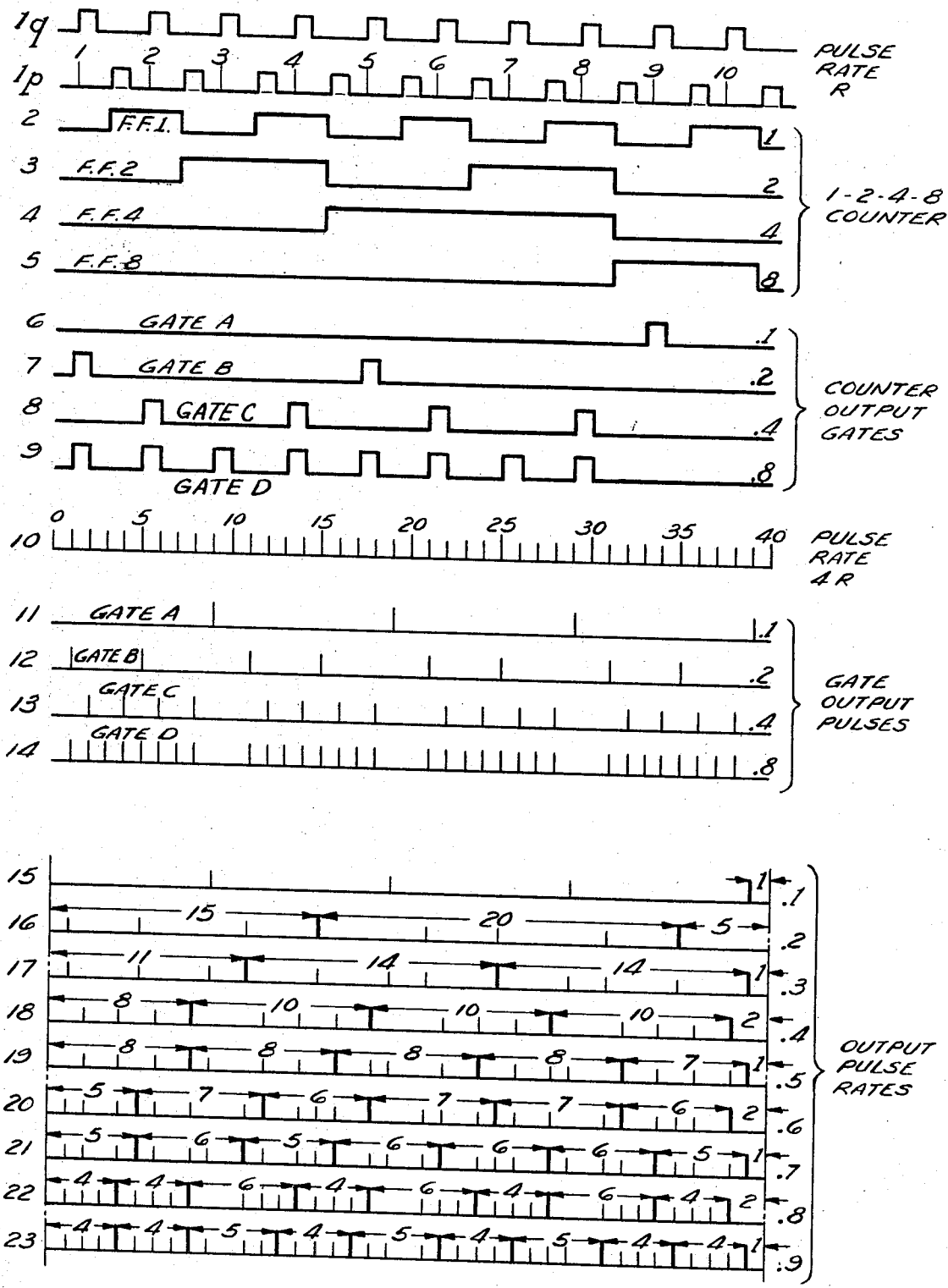
FIG. 3 is a pulse timing chart illustrating the manner in which the present pulsing system may be used.

Line $1p$ in FIG. 3 illustrates the evenly-spaced output pulses which are applied to the input of the counter 20 via the output line $1p$ from the clock pulse generator 15. When these pulses occur at the pulse repetition rate or frequency, R, the conductivity conditions of the respective counter stages or flip-flops are as shown at lines 2–5. The counter stage (F.F.1) weighted one has the binary $\bar{1}$ condition before the first input pulse, the binary 1 condition from input pulse 1 to input pulse 2, the binary $\bar{1}$ condition from input pulse 2 to input pulse 3, the binary 1 condition from input pulse 3 to input pulse 4, and so on. The second counter stage (F.F.2) weighted two has the binary $\bar{1}$ condition before input pulse 2, the binary 1 condition from input pulse 2 to input pulse 4, the binary $\bar{1}$ condition from input pulse 4 to input pulse 6, the binary 1 condition from input pulse 6 to input pulse 8, and the binary $\bar{1}$ condition from input pulse 8 until input pulse 12, and so on. The third counter stage (F.F.4) weighted four has the binary $\bar{1}$ condition before the fourth input pulse, the binary 1 condition from the fourth input pulse until the eighth input pulse, and the binary $\bar{1}$ condition from the eighth input pulse until the fourteenth input pulse, and so on. The fourth counter stage (F.F.8) weighted eight has the binary $\bar{1}$ condition before the eighth input pulse, the binary 1 condition from the eighth input pulse until the tenth input pulse, and the binary $\bar{1}$ condition from the tenth input pulse until the eighteenth input pulse, and so on.

In accordance with the present invention, the four AND gates A, B, C and D are connected to certain of the flip-flops in the binary coded decimal counter 20 such that, when the input pulse frequency to the counter 20 is multiplied and the output pulse frequency from the OR gate 21 is divided by the same multiple, there is achieved a "smoothing" or substantial equalization of the spacing between the pulses which are to be applied to the second servo system 11 in the FIG. 1 control system.

The AND gates A, B, C and D have respective gating control inputs $a$, $b$, $c$ and $d$ and clock pulse inputs connected to the second output line $1q$ of pulse generator 15. As shown in FIG. 3, at line $1q$, these clock pulses occur at the same pulse repetition rate or frequency as those on line $1p$, but the pulses on line $1q$ are time-displaced with respect to the pulses on line $1p$ long enough for the flip-flops in counter 20 to settle down to a stable condition after receiving each input pulse on line $1p$ before the next pulse is applied to line $1q$.

The first AND gate A is weighted .1, and it is capable of delivering a single output pulse for each ten clock pulses on line $1q$. In addition to its gating control input $a$ and its clock pulse input from line $1q$, the first gate A has an input connected to the binary $\bar{1}$ side of the first counter stage F.F.1 and an input connected to the binary 8 side of the final counter stage F.F.8. Consequently, as shown at line 6 of FIG. 3, if the gating control input $a$ is in the 1 binary state, gate A will pass the ninth clock pulse on line $1q$ to the OR gate 21.

The second AND gate B is weighted .2, and it is capable of producing two output pulses for every ten clock pulses on line $1q$. In addition to its gating control input $b$ and its clock pulse input from line $1q$, the second gate B has an input connected to the binary $\bar{1}$ side of the first counter stage F.F.1, an input connected to the binary $\bar{2}$ side of the second counter stage F.F.2, and an input connected to the binary $\bar{8}$ side of the final counter stage F.F.8. Consequently, as shown at line 7 of FIG. 3, if the gating control input $b$ is in the 1 binary state, gate B will pass the first and fifth clock pulses on line 1q to the OR gate 21.

The third AND gate C is weighted .4, and it is capable of producing four output pulses for every ten clock pulses on line 1q. In addition to its gating control input c and its clock pulse input from line 1q, the third gate C has an input connected to the binary 1 side of the first counter stage F.F.1, and an input connected to the binary $\bar{8}$ side of the final counter stage F.F.8. Consequently, as shown at line 8 of FIG. 3, if the gating control input c is in the 1 binary state, gate C will pass the second, fourth, sixth and eighth clock pulses on line 1q to the OR gate 21.

The fourth AND gate D is weighted .8, and it is capable of passing eight output pulses for every ten clock pulses on line 1q. In addition to its gating control input d and its clock pulse input from line 1q, gate D has an input connected to the binary $\bar{8}$ side of the final counter stage F.F.8. Consequently, as shown at line 9 of FIG. 3, if the gating control input d is in the 1 binary state, gate D will pass the first through the eighth clock pulses on line 1q to the OR gate 21.

The gating control inputs a, b, c and d to the respective gates A, B, C and D are connected to the output side of a decimal fraction selector 22, which may comprise a register, such as a binary shift register, having an individual stage for controlling each gate A, B, C, D. The register may be controlled by a record tape so as to select which of the gates A, B, C, D are to be opened during a particular period of operation of the machine tool control system, thereby determining the desired decimal fractional relationship between the speed of the second lead screw 13 and the first lead screw 12 for that period. For example, if the selector 22 energizes the gating control inputs b and c to the gates B and C, which are weighted .2 and .4, respectively, the second servomotor 11 will receive 6 pulses for every 10 pulses received by the first servo system 10, so that the second lead screw 13 will operate at 6/10 the speed of the first lead screw 12.

The outputs of the AND gates A, B, C and D are connected through an OR gate 21 to the input of the frequency divider 16. With this arrangement, for every ten pulses in both pulse trains produced by the pulse generator 15, the OR gate 21 will pass a certain number of pulses which depends on the decimal fraction determined by the selector 22.

One of the problems inherent in any pulsing system of this general type, where the user wants to be able to establish any one of several different fractional relationships between the pulse frequency of an output pulse train and that of a reference pulse train, is to achieve substantially uniform spacing between the pulses in the output pulse train for any selected fractional relationship.

The present invention is based upon the discovery taht an improved equalization of the output pulse spacing in a binary coded decimal pulse system can be achieved by providing a novel arrangement of the connections of the AND gates to certain stages of the binary coded decimal counter and combining with this novel connection arrangement the technique of multiplying the frequency of the input pulse train to the binary coded decimal counter and dividing the combined output pulse train from the AND gates by the same multiple.

Referring to FIG. 3, line 10 shows the input pulse frequency or repetition rate, 4R, which is four times the frequency, R, shown on line 1q and 1p. The output pulses from the AND gates A, B, C and D will have the timing shown in lines 11–14 of FIG. 3 for this increased frequency, 4R, of the input pulses to the binary coded decimal counter 20. While the time interval or spacing between successive output pulses from gate A is uniform, this is not true as to gates B, C and D, as will be evident from an inspection of lines 12, 13 and 14 of FIG. 3. However, the spacing between every fourth successive output pulse from gates B, C and D is substantially equalized. Also, when the output pulses of the gates A, B, C and D are combined to give the remaining decimal fractions, 3/10, 5/10, 7/10 and 9/10, the spacing between every fourth successive output pulse is substantially equalized.

To effect this division by four of the output pulse frequency, the aforementioned frequency divider 16 is connected to the output of the OR gate 21. Preferably, this frequency divider is a two-stage binary counter which delivers one output pulse for every four input pulses which it receives. Lines 15–23 of FIG. 3 show the effect of dividing the output pulses from gate 21 by the same multiple, in this case four, as the input pulses to counter 20 were multiplied by. Every fourth pulse is shown heavier than the three preceding pulses, which are not used.

Referring to line 15 of FIG. 3, when only gate A of the four output gates A, B, C, D is gated on, to provide the pulse frequency ratio 1/10, the frequency divider 16 delivers an output pulse in response to each 39th clock pulse on line 1q. The output pulses on line 15 are exactly evenly spaced apart for successive cycles of operation (each cycle of operation lasting for 40 clock pulses on line 1q.

As shown at line 16, when only gate B is gated on, to provide the pulse frequency ratio 2/10, the frequency divider 16 delivers an output pulse in response to each 15th and 35th clock pulse on line 1q. The output pulses on line 16 are evenly spaced for successive cycles of operation.

As shown at line 17 of FIG. 3, when only gates A and B are gated on, to provide the pulse frequency ratio 3/10, the frequency divider 16 delivers an output pulse in response to each 11th, 25th and 39th clock pulse on line 1q. The difference in the spacings between successive output pulses under these circumstances is never more than 2/40 of a cycle of the rate multiplier.

As shown at line 18 of FIG. 3, when only gate C is gated on, to provide the pulse frequency ratio 4/10, the frequency divider 16 delivers an output pulse in response to each 8th, 18th, 28th and 38th clock pulse on line 1q. These output pulses are evenly spaced.

As shown at line 19 of FIG. 3, when only gates A and C are gated on, to provide the pulse frequency ratio 5/10, the frequency divider 16 delivers an output pulse in response to each 8th, 16th, 24th, 32nd and 39th clock pulse on line 1q. The difference in the spacing between successive output pulses under these circumstances is never more than 2/40 of a cycle of the rate multiplier.

Referring to line 20 of FIG. 3, when only gates B and C are gated on, to provide the pulse frequency ratio 6/10, the frequency divider 16 delivers an output pulse in response to each 5th, 12th, 18th, 25th, 32nd and 38th clock pulse on line 1q. The difference in the spacings between successive output pulses under these circumstances is never more than 1/40 of a cycle of the rate multiplier.

Referring to line 21 of FIG. 3, when only gates A, B and C are gated on, to provide the pulse frequency ratio 7/10, the frequency divider 16 delivers an output pulse in response to each 5th, 11th, 16th, 22nd, 28th, 34th and 39th clock pulse on line 1q. The difference in the spacings between successive output pulses under these circumstances is never more than 1/40 of a cycle of the rate multiplier.

Referring to line 22 of FIG. 3, when only gate D is gated on, to provide the pulse frequency ratio, 8/10, the frequency divider 16 delivers an output pulse in response to each 4th, 8th, 14th, 18th, 24th, 28th, 34th and 38th clock pulse on line 1q. The difference in the spacings between successive output pulses under these circumstances is never more than 2/40 of a cycle of the rate multiplier.

Referring to line 23 of FIG. 3, when only gates A and D are gated on, to provide the pulse frequency ratio 9/10, the frequency divider 16 delivers an output pulse in response to each 4th, 8th, 13th, 17th, 22nd, 26th, 31st, 35th and 39th clock pulse on line 1q. The difference in the spacings between successive output pulses under these circumstances is never more than 1/40 of a cycle of the rate multiplier.

From the foregoing it will be evident that the output pulses from the frequency divider 16, which are applied to the second servo system 11, are substantially evenly spaced apart for any selected decimal fractional relationship, k, with respect to the frequency of the pulses applied to the first servo system 10.

The rate multiplier embodied in the present pulsing system operates entirely in accordance with the 1-2-4-8 binary coded decimal code, so that it is compatible with Electronic Industries Association standards for tape controls for machine tools and the like and it is compatible with other equipment in such control systems. In addition, the rate multiplier involves simple "hardware" and its operation may be readily understood.

While a presently-preferred embodiment of this invention has been described in detail and illustrated schematically in the accompanying drawings, it is to be understood that various modifications and adaptations may be adopted without departing from the scope of this invention. For example, if desired, the binary coded decimal counter may have one or more additional decades, such as a hundredths decade, to provide additional resolution of the decimal fraction, k, which specifies the relationship of the frequencies of the respective pulse trains.

Having described my invention, I claim:

1. A pulsing system comprising:
 a binary coded decimal counter having first, second, third and fourth bistable stages weighted 1, 2, 4, and 8, respectively;
 means for applying input pulses to the first stage of said counter at a frequency equal to a multiple of a reference frequency;
 first, second, third and fourth AND gates, each having an individual gating control input;
 said first AND gate also having an input connected to the $\bar{1}$ side of the first stage of the counter and an input connected to the 8 side of the fourth stage of the counter;
 said second AND gate also having an input connected to the $\bar{1}$ side of the first stage of the counter, an input connected to the $\bar{2}$ side of the second stage of the counter, and an input connected to the $\bar{8}$ side of the fourth stage of the counter;
 said third AND gate also having an input connected to the 1 side of the first stage of the counter, and an input connected to the $\bar{8}$ side of the fourth stage of the counter;
 said fourth AND gate also having an input connected to the $\bar{8}$ side of the fourth stage of the counter;
 means for combining into a single output pulse train the pulse outputs of said AND gates which are gated on by the respective gating control inputs;
 and means for dividing the frequency of said output pulse train by said multiple.

2. A pulsing system according to claim 1, wherein said multiple is 4.

3. A pulsing system comprising:
 a 1-2-4-8 binary coded decimal counter;
 means for applying input pulses to said counter at a frequency equal to N times a reference frequency, where N is greater than one;
 a plurality of AND gates having individual input connections to different stages of the counter;
 means for selectively gating on one or several of said AND gates to pass output pulses whose frequency is a corresponding decimal fraction of the frequency of the input pulses to the counter;
 means for combining into an output pulse train the output pulses of the AND gates which are gated on;
 and means for dividing by N the frequency of said output pulse train;
 said input connections of the AND gates to the counter being effective to substantially equalize the spacing between every successive Nth pulse in said output pulse train for every selective combination of the AND gates which are gated on.

4. A pulsing system according to claim 3, wherein said AND gates comprise first, second, third and fourth AND gates, the input connections of said first AND gate to the counter being effective to cause said first AND gate, when gated on, to pass a single output pulse for each ten input pulses to the counter, the input connections of the second AND gate to the counter being effective to cause said second AND gate, when gated on, to pass two output pulses for each ten input pulses to the counter, the input connections of the third AND gate to the counter being effective to cause said third AND gate, when gated on, to pass four output pulses for each ten input pulses to the counter, and the input connection of the fourth AND gate to the counter being effective to cause said fourth AND gate, when gated on, to pass eight output pulses for each ten input pulses to the counter.

5. A pulsing system according to claim 4, wherein:
 said first AND gate has an input connected to the $\bar{1}$ side of the 1 stage of the counter, and an input connected to the 8 side of the 8 stage of the counter;
 said second AND gate has an input connected to the $\bar{1}$ side of the 1 stage of the counter, an input connected to the $\bar{2}$ side of the 2 stage of the counter, and an input connected to the $\bar{8}$ side of the 8 stage of the counter;
 said third AND gate has an input connected to the 1 side of the 1 stage of the counter, and an input connected to the $\bar{8}$ side of the 8 stage of the counter;
 said fourth AND gate has an input connected to the $\bar{8}$ side of the 8 stage of the counter;
 and N is 4.

6. In a pulsing system having first and second servos to be operated at speeds having a predetermined decimal relationship k with respect to each other and each adapted to provide a unit of movement for each pulse applied thereto and wherein the pulses applied to the second servo are to be related to the pulses applied to the first servo by the factor kf, where f is the frequency of the pulses applied to the first servo and k is a decimal fraction designating the ratio of the movement of the second servo with respect to the movement of the first servo to be effected by the pulses:
 pulse generator means for generating a pulse train having a frequency Nf, where N is greater than one;
 frequency divider means connected between the output of said pulse generator means and the first servo for dividing the frequency of said pulse train by N and for applying to said first servo a pulse train having a frequency f;
 a binary coded decimal counter connected to the output of said pulse generator means and having first, second, third and fourth bistable stages weighted 1, 2, 4 and 8, respectively;
 first, second, third and fourth AND gates;
 said first AND gate also having an input connected to the $\bar{1}$ side of the first stage of the counter and an input connected to the 8 side of the fourth stage of the counter;
 said second AND gate also having an input connected to the $\bar{1}$ side of the first stage of the counter, an input connected to the $\bar{2}$ side of the second stage of the counter, and an input connected to the $\bar{8}$ side of the fourth stage of the counter;
 said third AND gate also having an input connected to the 1 side of the first stage of the counter, and an input connected to the $\bar{8}$ side of the fourth stage of the counter;

said fourth AND gate also having an input connected to the $\bar{8}$ side of the fourth stage of the counter;

means for selectively gating on one or several of said AND gates to pass output pulses whose frequency is a corresponding decimal fraction $k$ of the frequency $Nf$ of the input pulses to the counter;

means for combining into a single output pulse train the pulse outputs of said AND gates which are gated on by said last-mentioned means;

and means for dividing the frequency of said combined outputs by N and for applying to said second servo a pulse train having a frequency $kf$, where $k$ is determined by the AND gates which are gated on.

7. A pulsing system according to claim 6, wherein N is 4.

References Cited
UNITED STATES PATENTS

| | | | |
|---|---|---|---|
| 2,922,940 | 1/1960 | Mergler | 318—28 |
| 2,964,252 | 12/1960 | Rosenberg | 318—162 |
| 3,267,344 | 8/1966 | McDaniel | 318—162 |
| 3,278,817 | 10/1966 | Johnson et al. | 318—18 |

BENJAMIN DOBECK, Primary Examiner

U.S. Cl. X.R.

318—603